United States Patent [19]

Brougham et al.

[11] 4,193,089

[45] Mar. 11, 1980

[54] TELEVISION RADIATION IMAGING SYSTEM AND METHOD

[75] Inventors: Robert W. Brougham, Chesterland, Ohio; Paul Mitchell, New York, N.Y.

[73] Assignee: Picker Corporation, Cleveland, Ohio

[21] Appl. No.: 870,440

[22] Filed: Jan. 18, 1978

Related U.S. Application Data

[63] Continuation-in-part of Ser. No. 788,084, Apr. 15, 1977, abandoned, which is a continuation of Ser. No. 664,368, Mar. 5, 1976, abandoned.

[51] Int. Cl.² ............................................. H04N 7/18
[52] U.S. Cl. ...................................... 358/111; 358/211
[58] Field of Search ................................ 358/111, 211

[56] References Cited

U.S. PATENT DOCUMENTS

| 2,213,173 | 8/1940 | Rose | 358/211 |
| 3,602,641 | 8/1971 | Heise | 358/111 |
| 3,958,078 | 5/1976 | Fowler | 358/111 |
| 3,996,420 | 12/1976 | Geluk | 358/111 |
| 4,058,832 | 11/1977 | Vag | 358/111 |

OTHER PUBLICATIONS

Van Asselt, R. L., "The Image Isocon as a Studio, X-Ray, and Low-Light Camera Tube", Nec Proceedings 1968.
Musselman, E.M. et al, "The Image Isocon—an Improved Image Orthicon".
Neuhauser, R. G. "Characteristics and Mode of Operation of Image Orthicons," Proceedings of N.A.B. Convention, April 1962.

*Primary Examiner*—Howard W. Britton
*Attorney, Agent, or Firm*—Watts, Hoffmann, Fisher & Heinke Co.

[57] ABSTRACT

A radiation imaging system and method is disclosed for producing an enhanced television image from a light image produced by an image intensifier tube having an unusually large output face and corresponding to a pattern of penetrative radiation from a subject. A source directs radiation such as X-rays through the subject and the image tube converts the emergent radiation pattern to a corresponding visible light image at an output phosphor. A television apparatus including a pickup tube views the output light image at a tube input face by way of a lens assembly and converts the light image to electrical, including video, signals. A television monitor reconverts the electrical signals to a visible television image of enhanced quality representing the pattern of radiation from the subject.

The illuminated portion of the image tube output phosphor is similar in size and has the same shape as the input face of the television pickup tube. A particularly advantageous lead oxide target vidicon television pickup tube is used. The system includes a video enhancer circuit which emphasizes detail of the television image represented by specific frequency components of the video signals by affecting the magnitudes of the variation of those video signals having a frequency of predetermined value, relative to the lower frequency components.

32 Claims, 5 Drawing Figures

TELEVISION RADIATION IMAGING SYSTEM AND METHOD

CROSS-REFERENCE TO RELATED APPLICATIONS

This application is a continuation-in-part of application Ser. No. 788,084, filed Apr. 15, 1977, now abandoned, which in turn is a continuation of application Ser. No. 664,368, filed Mar. 5, 1976, now abandoned.

BACKGROUND OF THE INVENTION

This invention relates to an X-ray television imaging system producing television images of enhanced quality from radiation patterns from a subject, converted to light images by an image tube.

DESCRIPTION OF THE PRIOR ART

In many medical X-ray diagnostic procedures, radiopaque material is injected into, or ingested by, a patient and X-rays are then directed through the patient. The radiation which is transmitted through the patient produces a fluorographic and/or a radiographic shadow image of the opacitized body elements and unaffected bone and tissue. This image provides patient diagnostic information.

A basic type of X-ray inspection is so-called "bright fluoroscopy." With bright fluoroscopy an image intensifier tube produces an intensified fluoroscopic image which is viewed selectively or concurrently by film and television cameras. Television imaging techniques produce a substantially continuous image of the region of interest of the body. The film camera produce both single frame ("spot") photographs, and motion picture or "cine" exposures.

Television imaging is particularly useful in applications in which the areas of differing radiopacity in the subject exhibit motion or are otherwise time varying. Television, for example, can allow the physician to watch the progress of a radiopaque material ingested by the subject through the alimentary canal, or can be used to observe progress of such material injected into blood vessels.

With a typical bright fluoroscopy system, an X-ray image tube is axially aligned with an X-ray beam. An X-ray stimulated light image is produced on an input phosphor of the image tube. This light image causes an adjacent electron emitting layer to emit electrons that are accelerated against an output phosphor to produce a small considerably intensified, or brightened, output image.

A so-called "optical cube" is coupled to the image tube. The optical cube typically has an axially aligned television camera and spot and cine film cameras positioned with their optical axes normal to an extension of the image tube axis. Transmissive mirrors, known as "beam splitters," are used to selectively distribute the light to either of the two film cameras plus to the television camera. The output of the television camera is transmitted to one or more monitors for dynamic viewing of a study being conducted.

Many variations of the described system have been proposed or produced. For example, film cameras have been used to produce either single frame or moving picture images of the output of a television monitor. While the output of the television monitor has been photographed, the resolution of photographic images of television monitors has been poor as compared to that of images produced by cameras that are optically coupled to the output phosphor of the image tube.

Systems have been produced in which the X-ray source was pulsed in synchronism with the field scan rate of a television camera. This reduced the X-ray dosage received by the patient in the course of an examination, while sustaining a continuous image on the television monitor so long as cine and spot films were not being taken.

The system described here, while furnishing adequate television fluoroscopic images for general observations and some diagnostic purposes, has not provided television images of sufficiently high resolution for diagnosis in many other procedures. This inadequacy results from loses incurred during the repeated optical manipulation and transfer of information representing of image intelligence.

The ability of any optical element or system (including, e.g., an image tube, a lens, a television camera, and a television display) to resolve images is often described in terms of its "modulation transfer function" (MTF). Normally, the ability of an optical system to resolve a portion of an image decreases as the fineness of detail of the image portion (the number of lihnes per unit distance) increases. This degraded resolution is manifested as a reduction in the contrast between the light areas and the dark areas of the image portion. The number of lines per unit distance is frequently expressed as "line pairs per millimeter," and is known generically as the "spatial frequency" of the image portion of interest.

The modulation transfer function (MTF) is defined as the function of the percent of contrast in the image with respect to each patial frequency of all features of the image portion. The percent of contrast is defined as a function of the maximum light energy per unit area (brightness) in the light areas of the picture portion under consideration (Bmax) and the energy per unit area of the darker areas (Bmin). Specifically, the contrast ratio is defined as:

$$\text{percent contrast} = \frac{Bmax - Bmin}{Bmax + Bmin}$$

Tests on several prior art X-ray television imaging systems have shown these systems as having a total "modulation transfer function" defined approximately by the ranges of points designated as follows:

| Line pairs/m.m. | % Contrast |
| --- | --- |
| 0.25 | 50–65 |
| 0.50 | 15–45 |
| 1.00 | 0–5 |

Because of the limited resolution of past television imaging, examiners have employed the television images mostly for general observation to determine regions of interest.

Once the region of interest is determined, radiographs or films of the image tube output are used for the final diagnosis.

The limited resolution of prior systems resulted in part from brightness losses in the optical coupling between the output phosphor of the image tube and the television pickup tube. Attempts were made to improve prior systems with circuitry for enhancing the contrast of the television image, but such attempts failed to improve resolution, because of the deterioration of the signal to noise ratio in the television image. Other attempts to improve resolution included the use of very large aperture lenses for the lens assembly, but such lenses are quite expensive and suffer from significant aberrations which distort the transmitted image. The necessity for providing the mirror structure associated with the lens assembly (for enabling the use of the second film camera) resulted in substantial vignetting of the image. The television pickup tubes employed in the previous systems also suffered a deterioration in resolution when operated in the pulsed mode. The television monitors used were not readily engageable for operation with film cameras, and these displays suffered deteriorated modulation transfer functions when image brightness was increased substantially.

The magnification of the output phosphor image (which was about 20 millimeters in diameter) was required of the lens assembly to take full advantage of the input face area of the television pickup tube, which is about 35 millimeters in diameter. The required magnification of the image tube output image causes a loss of brightness in the lens assembly in the course of transmission from the output phosphor to the pickup tube. The image becomes dimmer when magnified.

The prior system failed to provide television images of sufficient resolution also because of noise in the electrical television composite signals. Both the noise and the poor resolution result from severe restrictions on the intensity of X-rays which may safely be directed through the subject. With such low X-ray intensities, the visible image at the image tube output is relatively dim, and of low contrast, and the prior system did not have sufficient sensitivity to resolve these low contrast images. Improvement of the system has been attempted by various means of generalized contrast enhancement of the television image by amplification, but these attempts have not been very successful. When the signals from the television camera are uniformly amplified to increase contrast, amplified noise present in the television signals is amplified, objectionable in the television image produced.

Several other means have been attempted to enhance the sensitivity and the resolution of the prior system. One of these has included the use of very large aperture lenses for the lens assembly between the output phosphor and the television camera input, to gather as much light as possible from the image tube output and transmit it to the television camera with minimum attenuation. Such lenses have had apertures of as much as f0.75. The lens assemblies have included a collimating lens positioned to receive the image from the output phosphor, and a focusing lens to focus the image on the television pickup tube input. The need for magnification of the output phosphor image dictates that the collimating and focusing lenses be unmatched.

Large aperture lenses are expensive. The expense is further aggravated by the need for two different lenses for each system. The use of lenses having different focal lengths (i.e., nonsymmetrical) can cause lens aberrations occuring in each lens to be additive and to distort the transmitted image.

In the prior system, the two lenses of the lensing system have been separated by a distance, required to accommodate the mirror beam splitter therebetween, for directing a portion of the light from the output phosphor passing through the collimating lens, to the second film camera disposed transverse from the optical axis of the system. This spacing between the two lens elements contributes to vignetting (loss of brightness in the peripheral areas of the image with respect to central brightness) of the image passed to the television pickup tube.

Other structures have also been designed to provide for direct photography of the image at the output phosphor of the image tube. According to this other structure, the second film camera is aligned with the optical axis of the image tube, and the television pickup tube is disposed transverse to that axis. A diverter is provided in the optical axis, positioned between a set of lenses for transmitting and focusing the output phosphor image. The diverter deflects light energy from the output phosphor to the television camera in synchronism with the field scan rate of the television pickup tube. During the remainder of time, the diverter allows the unimpeded passage of the output phosphor energy to the film camera. Such a system is described in the copending application Ser. No. 537,776, filed Dec. 31, 1974 by Fred H. Meyer and assigned to the assignee of this application, which issued as U.S. Pat. No. 4,058,833 on Nov. 15, 1977.

Both these systems for deploying the second film camera require the camera to be mounted in a fixed spatial relation to the image tube, lens assembly, television pickup tube and, with respect to the system of application Ser. No. 537,776, the diverter.

The sensitivity and resolution of the prior systems has been improved somewhat by the use of highly sensitive image isocon television pickup tubes. The image isocon includes an input face (photocathode) for emitting electrons in accordance with the brightness distribution of the viewed visual image, and a glass target upon which the electrons from the photocathode are directed. A conductive mesh is interposed between the photocathode and the target, being displaced approximately 25 microns from the target. The charge distribution on the target varies corresponding to the viewed image, i.e., to the pattern of electrons directed onto the target by the photocathode. An electron gun produces a reading beam current of electrons which is scanned across the target line by line. Part of the beam current landing upon the target causes electron scatter which is reflected back away from the target. This reflected scatter current varies with respect to the potential change distribution on the target. By sensing the instantaneous charge flow rate of electrons reflected from the target, an electrical signal is derived representing in analog fashion the instantaneous relative brightness of each portion of the viewed image being scanned.

The inherent resolution of the image isocon television pickup tube is enhanced by a phenomenon known as "redistribution." When electrons from the photocathode strike the target, they cause a secondary emission from the target of between three and four times the primary photoelectrons. Normally these secondary electrons migrate to the mesh, which is normally maintained at a potential about 3 volts more positive than the readout electrons. This results in an accumulation of net possitive charge in the region of the target during a continuous influx of electrons from the photocathode to the target. When the net charge in the target region approaches the mesh potential, the secondary electrons, rather than moving toward the mesh, "redistribute" themselves at nearby locations on the target. This redistribution is such that the charge distribution areas on the target representing dark areas become darker, and those areas representing lighter areas become lighter. This generally enhances the outlines of the highlight portions of the image, as represented by the target potential pattern and thus by the video signal which is produced by the reading beam. This feature is particularly advantageous in X-ray systems, because of inherent low detail and low contrast of the visible image at the image tube output phosphor.

The image isocon, however, loses a significant portion of its advantages when used in a pulsed X-ray system, wherein the pickup tube scan rate is equal to the pulse rate, i.e., about 1–6 cycles per second. The image isocon exhibits degraded redistribution in the pulsed mode of operation. It is not believed fully understood why the image isocon exhibits pronounced redistribution only in substantially continuous operation, but this is nonetheless a fact, and inhibits its utility in pulsed X-ray applications.

The prior system had very substantial mass and bulk, due to the need for mounting the second film camera on the unit in an integral fashion with the other system elements to maintain its disposition for making the direct high resolution photos of the output phosphor image. This requirement increased the complexity, size and cost of equipment for supporting and maneuvering the system about the patient's body.

The prior system lacked flexibility of use, in the remote viewing of real-time high resolution images was not possible. Rather, the film had to be removed from the second film camera and processed before viewing, a time-consuming and annoying process which often extended the time the patient had to remain in the examination room.

The size of the prior system and of the mechanism for moving it sometimes caused patients undue anxiety.

In the past, the size and mass of the imaging system, and the need for moving it efficiently about the patient, generated much effort in providing mechanisms for support and easy motion. Such support apparatus included tall tower structures and complex counterweighting systems. As systems grew heavier, the problems of support and motion became more acute, and the mechanisms substantially increased the amount of space required in the examination room. Great care had to be used to mount the apparatus for safe support of the heavy imaging systems.

It is a general purpose of this invention to provide a high resolution, low noise compact television imaging system for producing high quality television images from visible light images from a particularly designed X-ray image intensifier tube.

SUMMARY OF THE INVENTION

The system and method incorporating this invention overcomes the disadvantages of the prior system by providing an improved X-ray television imaging system for producing improved quality television images. The system includes a source for directing pulses of penetrative radiation such as X-rays through a subject, and an image tube for receiving the patterns of radiation emerging from the subject, and converting these radiation patterns to corresponding visible light images at an output phosphor. A lens assembly focuses the light image on the input face of a television camera pickup tube to produce a composite electrical television signal representing the visible light image from the image tube. Video enhancement circuitry processes the video portion of the composite television signal to emphasize fine image detail represented by the video signals. Resulting enhanced high quality television signals are reconverted to a second light image of improved quality by a television monitor, this image being both viewable directly, and susceptible of recording by a film camera. Also, a second television monitor for viewing only by eye may be applied.

The improvements of this system derive from several specific features. According to this invention, the image intensifier is constructed with a larger (35 mm) output phosphor, thus reducing the image degradation. Further, the input screen, receiving patient data in penitrative X-ray form is designed to obsorb and respond to a greater proportion of this data. The resulting greater detail is obtained at the expense of a less bright output image.

The system utilizes a television pickup tube having improved sensitivity and resolution in the pulsed mode. The video signals generated by the television pickup tube and camera control circuitry are processed to enhance disproportionately those video signals representing fine detail, to improve resolution in the visual image which is produced by the television monitor. The improved resolution of the television imaging system makes possible the simplification of the system for producing diagnostic quality images.

The improvement to the image tube enables the use of a simpler, less costly, and more effective lensing assembly for transmitting the image tube light image. The lensing assembly can have a magnification ratio of close to one to one, since the closer matching of the larger size of the image tube output phosphor and the pickup tube input face removes the need for magnification of the light image. Moreover, this magnification becomes magnification. Absence of the magnification requirement provides for transmission of the light image with less brightness losses, compared to conditions requiring magnification. According to another feature of the invention, the lens elements are placed close together, i.e., approximately $\frac{1}{8}$ inch apart, since a diverting mirror and the space dimensions it required are removed. Thus causing a reduction in vignetting of the transmitted light image.

The sensitivity and resolution of the pickup tube is improved by its embodiment as an image isocon tube, having high sensitivity and resolution properties. The resolution of the image isocon in pulse-mode operation is improved by reducing its target to mesh distance to approximately 12 microns, improving the modulation transfer function of the assembly consisting of its target and mesh. Further, if desired, a lead oxide vidicon may also be employed with a resulting improvement in pulsed readout performance.

The video portion of the composite television signal from the television camera control circuitry and pickup tube is improved by a video enhancer circuit. The video enhancer circuit increases the amplitude of variation of video signals having frequencies of 1 Megahertz (MHz) and greater, relative to lower frequency signals. The high frequency video signals correspond to fine details of the image thereby represented.

The improved monitoring apparatus includes a cathode ray tube having a planar face rather than the conventional convex face, for improved optical coupling with lenses, cameras, and other downstream processing apparatus. The monitoring apparatus has an improved output phosphor, producing a blue light, to which most films are more sensitive than to other colors, enabling more rapid film exposures. The cathode ray tube also has a smaller beam focal spot than previously used in these applications, i.e., about 0.0017 to 0.0024 inches in diameter, for normal beam currents of about 4 to 25 microamperes.

The increased resolution of this system for the first time makes possible the production of diagnostic quality television images of X-ray patterns, making television imaging more useful than ever before. This increased performance eliminates the previous reliance on a second film camera for making diagnostic quality images. Such second film cameras required mechanisal and optical coupling at the location at the image intensifiers.

The elimination of the second film camera decreases the size and mass of the imaging system, and the applicability of television imaging for producing diagnostic images improves the flexibility of the system.

The smaller, lighter imaging system reduces the complexity and cost of the support and motive structures required for its use. The smaller system is less unnerving to patients. Images produced by the system can be viewed instantaneously as generated, and the viewing can also take place at a location remote from the patient. Several imaging systems can be multiplexed together with a single viewing station to enable one head physician to view images of several patients in rapid succession without moving about. Film recording can be accomplished in a separate room or within the examination room, whichever meets the needs of the hospital X-ray department.

The filed concurrently referenced case relates to various aspects of this imaging system and its operation. The demarcation between these cases exist because of differences in the inventor-ship of the various features claimed therein.

DESCRIPTION OF THE PREFERRED EMBODIMENT

Figure 1:
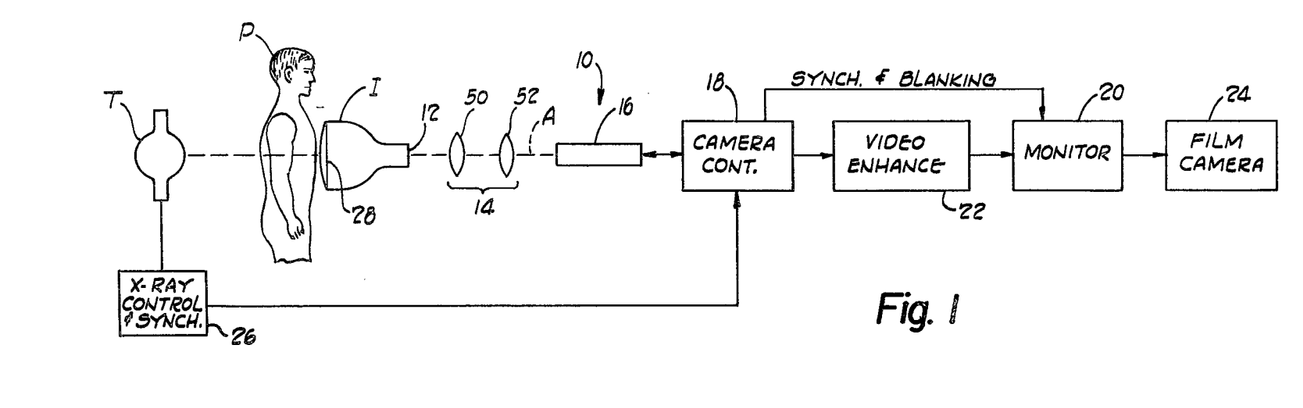
FIG. 1 is a diagrammatic and block diagram illustrating a system incorporating the features of this invention.

FIG. 1 shows an X-ray television imaging system incorporating the improvements of the present invention. The imaging system converts patterns of penetrative radiation, such as X-rays, emanating from a subject to a corresponding improved television image. An X-ray tubehead T directs X-radiation through a subject patent P. An image tube I receives the patterns of X-radiation emanating from the patient P and produces a visible light image corresponding thereto at an output phosphor 12. The visible light image is transmitted by a lensing assembly 14 along an optical path A to the input face of a television camera pickup tube 16. Camera control circuitry 18, in cooperation with the pickup tube 16, controls the pickup tube and generates signals in conjunction therewith comprising a television composite electrical signal representing the visible light image appearing at the output phosphor 12 and viewed by the pickup tube 16. The camera control circuitry 18 transmits scanning, synchronization and blanking signals to a display monitor 20, and transmits the video portion of the electrical television composite signals to a video enhancement circuit 22. The video enhancement circuit 22 increases the relative amplitude variation of these video signals having a frequency above a predetermined value, i.e., those video signals representing fine detail in the image appearing at the output phosphor 12. The video enhancer circuit 22 transmits the enhanced video signals to the monitor 20. The monitor 20, in response to the television composite signal, produces a visual display constituting an enhanced quality image corresponding to the light image appearing at the output phosphor 12. A film camera 24 is positioned to view the monitor display and to record the images appearing thereon on light sensitive film.

The penetrative X-radiation is generated by the X-ray tubehead T in pulses occurring from about one to six per second in response to signals from an X-ray control synch circuit 26. The field scanning cycles of the pickup tube are synchronized by the circuit 26 to occur a short time after each X-ray pulse from the tube T. This relative infrequency of scanning (compared with the normal television rate of 30 cycles per second) is known as "pulsed mode" operation. The pulsed X-radiation passes through the body of the patient P and emerges therefrom in patterns which represent information as to the condition of his body. The X-ray tubehead T and the control circuitry 26 are both of known type, and can be provided by one of ordinary skill.

The image tube I receives the patterns of penetrative radiation from the patient P and converts these patterns to corresponding light images for subsequent processing. The image tube I is an improvement of a known type, and includes a photo-cathode portion 28 with approximately a 9-inch diameter, which emits electrons in response to the impingement of the penetrative radiation pattern thereon. Electrical apparatus (not shown) accelerates and foruces the electrons from the photo-cathode onto a large output phosphor 12. The output phosphor 12, in response to the impingement of these electrons, emits visible light energy in a pattern corresponding to the pattern of received penetrative radiation. The input phosphor is preferably made of a single crystaline cesium iodide material having high X-ray obsorption properties.

The image tube is improved for this application over those of the prior art by its provision with an output phosphor considerably larger than those used previously. This increases the detail at the image by reducing M.T.F. loses at that plane. The matching of its size and shape with that of the input face of the pickup tube 16, is described more fully below. Preferably, the output phosphor 12 is of circular configuration, having a diameter of approximately 35 millimeters.

The 35 millimeter output phosphor is larger than has normally been applied in prior image tubes. Prior to the present invention, image tube output phosphors were of the nature of 20 to 25 millimeters in diameter. The phosphors were made small to keep brightness at a maximum since output brightness, for a given input face size, is inversely related to output phosphor size.

In prior television imaging systems, maximizing brightness was of prime importance, due to the degree of performance imperfections in other system components. Accordingly, the use of larger output phosphors appeared contra-indicated because prior systems could not afford the loss of output brightness. Since the larger output phosphor produces a more detailed, though dimmer, immage, this additional detail had to be forgone.

The present system, however, having superior modulation transfer functions of its other components, is unique in its ability to utilize the dimmer image of the larger output tube, taking advantage of its improved detail.

The pickup tube 16 receives light energy from the visible light image appearing at the output phosphor 12 and converts the light energy to an electrical video signal bearing brightness information corresponding to the brightness distribution of the visible light image. The television pickup tube 16 can suitably comprise an image isocon tube. The image isocon tube has an inherent sensitivity and resolution capability superior to many previous tubes, due in part to a phenomenon known as "redistribution" which is described in detail below. The redistribution phenomenon, however, is attenuated considerably during the tube operation in the plused mode (as practiced in this case) as opposed to continuous operation, and hence its resolution suffers in the pulsed mode. The image isocon, therefore, has been improved to compensate for this attenuation of the desirable redistribution characteristic.

Figure 2:
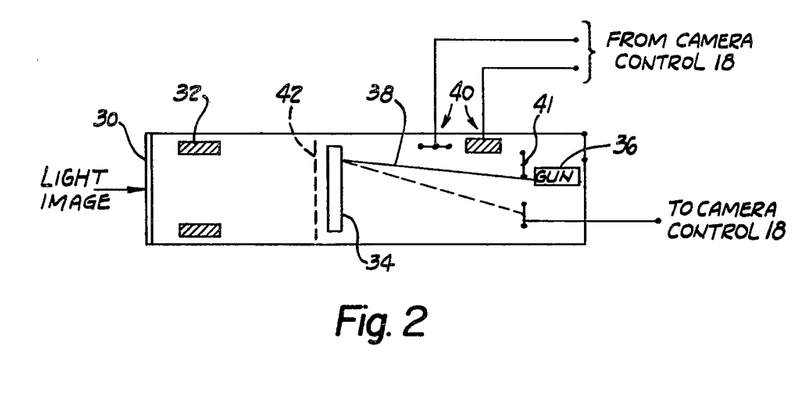
FIGS. 2–4 are detailed diagrammatic views showing the internal structure of portions of the system illustrated in FIG. 1.

The major components of the image isocon are illustrated diagrammatically in FIG. 2. Light energy from the output phosphor 12 impinges upon a photocathode input face 30, which responds thereto by emitting electrons in a pattern corresponding to the spatial brightness distribution of the received light energy. These electrons are accelerated by an electrostatic potential gradient and caused to focus by a focus yoke 32 toward a glass target 34.

Some of the electrons strike the glass target and the target thereby acquires a charge pattern thereon which has a special distribution corresponding to the brightness distribution of the viewed light image. An electron gun 36 directs an electron reading beam 38 toward the target 34, the beam scans across the target in a line-by-line fashion by a set of deflection and focusing coils often called yokes, generally designated in FIG. 2 as 40 and controlled by the camera control circuitry 18. Preferably, the scanning cycle constitutes a 945 line scan, taking place in about 33 milliseconds. The scanning is done in a "progressive" or sequential line-by-line consecutive mode, as defined, in *Television Fundamentals-Theory Circuits and Service,* Fowler and Lippert, McGrow-Hill, 1953, at pp. 11, and 446-447. The scanning is of the single frame variety, wherein a signal terminates picture production in known fashion (for example, by interrupting vertical drive pulses) in response to a vertical drive pulse signal indicating that the end of a frame has been reached.

As the reading beam 38 scans the target 34, scattered electrons are emitted from the target surface which are returned in the general direction of the electron gun 36. The current represented by the flow of these scatter electrons depends on the energy transfer, and hence the charge at the target portion being scanned. By sensing the current of the reflected scatter electrons as the reading beam scans (e.g., by way of a known sensor 41 connected to a sensing sicruit) a signal can be derived which corresponds to the instantaneous brightness represented by the charge distribution of the portion of the target being scanned at any given moment. This signal, bearing brightness information, is known as the video portion of the television signal, and, as described below, is used in producing a visible image having a brightness distribution corresponding to that of the visible image sensed by the pickup tube 16.

Electrons striking the target 34 from the photocathode 30 cause the target to emit secondary electrons. Some of these secondary electrons are not collected by the target mesh on return to the target. In doing so, they "redistribute" their charge in such a manner that the contrast of the image represented by the potential distribution on the target is enhanced in contrast and outline. This phenomenon is most in evidence when the pickup tube is operated in a continuously scanning mode, but is less effective when the tube is operated in a pulsed mode, e.g., scanning taking place only once which is relatively short compared with the time between the scanning operations. The structure of the image isocon has been modified in accordance with this invention to compensate for this decrease in the redistribution phenomenon.

When electrons from the photocathode 30 strike the target 34, about 3–4 as many of the secondary electrons are emitted by the photocathode. The secondary electrons have a low energy level (about 1 to 3 electron volts). Since each incident electron causes the release of several secondary electrons, the target takes on a positive potential in the regions where it is struck most heavily by electrons from the photocathode. These positively charged areas of the target represent light areas of the picture, the less positively charged areas representing the darker regions.

The glass target 34 is part of a target assembly which also includes a fine conductive mesh 42. The mesh 42 is positioned on the side of the target facing the photocathode, and is quite close to the target. The mesh is maintained at a voltage of approximately 3 volts positive relative to the target. The mesh collects and conducts these secondary electrons which are emitted from the target in response to the incidence of electrons from the photocathode. If the mesh 42 did not collect these secondary electrons, they would simply fall back onto the target, the areas of positive charge would not be created, and no charge potential representing the image would be produced on the target.

When the image isocon views an image, a large number of electrons from the photocathode strike the target, and the target thereby acquires a substantial overall positive charge, raising its potential to the point at which it approaches the potential on the mesh. As this occurs, the mesh attracts a smaller fraction of the secondary electrons. The remaining electrons which are not so attracted are relatively free to fall back upon the target. It is known that, as these secondary electrons return to the target, most of them cut magnetic field lines of the focus field and they are displaced from their original transit paths. In this way, they return to areas of the target adjacent to where they originated. They thus alter or "redistribute" the potential distribution of the target such that the potential areas representing the darker portions of the image appear even darker to the reading beam.

It is clear that the phenomenon takes place in the image isocon, and that it enhances the resolution capabilities of this pickup tube by causing the outlines of the image to become more distinct and the contrast to become greater.

This redistribution effect is substantially attentuated when the image isocon is operated in the pulsed mode, i.e., when it scans at a slow reciprocation rate of from one to six cycles per second. The reason for this degradation of the redistribution effect is not fully understood, but the resolution advantage of the image isocon over other camera tubes deteriorates substantially when the tube is operated in this pulsed mode.

The image isocon of this invention has an improvement feature which compensates for the deterioration in resolution in pulsed mode due to the degradation of the redistribution effect. Specifically, this compensation is an improvement in the modulation transfer function of the target assembly (the target 34 and mesh 42) which is achieved by placing the mesh very close to the target. Preferably, the mesh of the image isocon of this invention is located approximately 12 microns from the target. The target and the photocathode being separated normally at approximately one and one-half inches.

The image isocon tube, modified in accordance with this invention, had good performance in this application. Another suitable embodiment of the pickup tube that has been employed is the lead oxide vidicon tube, also known as the "Plumbicon". A suitable lead oxide tube, is Model 45XQ, manufactured by Amperex Corporation, Slatersville, R.I.

In prior television imaging systems, sensitivity of the television camera pickup tube was considered paramount for good quality images. The desirability of employing the lead oxide vidicon tube was not apparent before tests were performed on the system using the image isocon. In further tests, the lead oxide vidicon was discovered to be better suited in many aspects for this system than the image isocon.

Due to superior performance of other components of this system other than the pickup tube, it was discovered that the superior sensitivity of the image isocon, is not absolutely essential in this system due to the high caliber of overall system performance. The isocon's added sensitivity can for the first time be traded off for advantages of the lead oxide vidicon which the isocon does not possess.

Among these advantages of the lead oxide vidicon is superior scanning readout capabilities when operated in a pulsed radiation, single frame mode, as is the case in this system. Even the image isocon, improved as described above, does not produce image quality as desirable as the otherwise less sensitive and previously contraindicated lead oxide vidicon.

This is because the target in the lead oxide vidicon is held at a substantially stable potential, while the target in the isocon varies in potential, and this variation is the most pronounced when operated in pulsed radiation, single frame mode. The variations in the target potential of the isocon cause it to accept or reject charge with an affinity which varies with the brightness of the scene viewed, due to the fact that the amount of electron charge residing on the isocon's target is a function of the image brightness. Therefore, the isocon will record its image in the form of charge on the target in a somewhat different pattern when viewing a bright scene than when viewing an identically configured, but darker, scene. This obviously will adversely affect image quality. The lead oxide vidicon, on the other hand, has a potentially stable target, and accepts and rejects charge in a similar fashion substantially regardless of the brightness of the scene viewed.

The effective input face of the pickup tube photocathode 30 has a circular form approximately 35 millimeters in diameter, when the 3" "image isocon" is used. When the plumbicon, 45XQ is employed, this dimension becomes approximately 28 mm.

Size matching of the output phosphor 12 with the photocathode 30 makes possible the use of a lensing assembly 14 which is simpler, less costly, and has better performance characteristics than the previously employed lensing systems, which were required to magnify, due to unmatched size of these components. This lensing system is shown in detail in FIG. 3, as interposed along the optical axis between the output phosphor 12 and the photocathode 30 of the pickup tube 16. The lensing assembly 14 includes a pair of generally similar lenses 50, 52. The lens 50 acts as a collimating lens, and the lens 52 acts as an imaging lens to focus the collimated rays from the output phosphor 12 onto the photocathode 30. The lenses 50, 52 are separated by a distance L of approximately ⅛", and preferably have apertures of about f2 and focal lengths of about 100 millimeters.

Figure 3:
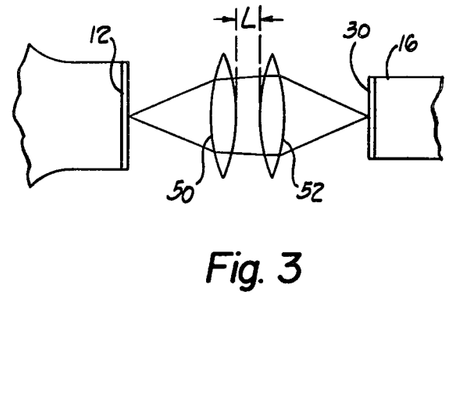

Several advantages derive from the use of the lensing assembly as shown in FIG. 3. Each lens tends to cancel out certain odd harmonic aberrations of the other, resulting in a reduction of distortion of the transmitted image. This approximate lens symmetry is made possible by the absence of a requirement for substantial size change of the image from the output phosphor 12, due to the output phosphor 12 being approximately size matched to the photocathode effective input area 30.

When the alternate camera tube is employed, (the 45XQ plumbicon) the photosensitive surface is of approximately 28 mm size, requiring a minification of the 35 mm image by 1.25. (e.g. 35 mm ÷ 1.25 = 28 mm). Such an arrangement increases the image brightness falling on the receiving camera tube.

The two lenses have, in both configurations, very close lens spacings are made possible by the removal of the need to proportion much of the image information directly into the dimensions of a film camera image for recordings. By directing all this image defining light energy into a high modulation transfer device such as a television camera tube and high quality T.V. circuitry, rather than expanding it directly from the image tube to photographic dimensions, the quality of information is retained at diagnostic levels. This high quality of the television image eliminates the need for making direct photographs of the output phosphor 12 by a mirror and second film camera between the lenses 50, 52 (forcing separation of these lenses). The close spacing of the lenses reduces vignetting, i.e., loss of brightness in the peripheral areas of the transmitted image, and improves the transmission characteristics of the lens assembly 14.

The camera control circuitry 18 produces known signals for controlling the progressive scanning and focus of the electron reading beam of the pickup tube 16, and for blanking the electron reading beam at appropriate times to accomplish consecutive progressive line-by-line scanning of the target by the reading beam. The camera control circuitry receives the video signals from the camera tube and thereby transmits information representing the diagnostic detail of the image viewed by the pickup tube. The camera control circuitry 18 additionally produces horizontal and vertical synchronization pulses which, with the video and blanking signals, constitute the composite electrical television signals. The camera control circuitry 18 transmits the synchronization and blanking signals to the television monitor 20 to control the operation of the monitor 20 to produce a suitable single frame raster which, when modulated with the video signals, produces a television image of the light image at the output phosphor 12. The single frame operating mode is achieved by interrupting the flow of vertical drive signals in response to the occurrance of a vertical drive pulse indicating the end of one frame, and maintaining the interruption until a new picture is called for by an operator.

The video signals are transmitted from the camera control circuitry to a video enhancement circuit 22 before being passed to the monitor. The video enhancement circuit 22 increases the relative amplitude variations of the video signals representing the detail in the image represented by the electrical television signals (i.e., the video signals having relatively high frequencies) with respect to the amplitude variations of the lower frequency video signals.

The video enhancement circuitry 22 (see FIG. 4) further produces a video output signal in which the high frequency video signals from the pickup tube 16 have an increased amplitude with respect to the lower frequencies. This enhancement of the higher frequency components produces a video output which enhances the fine detail of the image thereby represented. The fine details emphasized include representations of small variations in X-ray permeability of tissue which are used to identify the types of tissue appearing in the patient anatomy. Other fine details emphasized include interfaces between these types of tissue. Such an enhanced image appears sharper and subjectively more easily detectable than unenhanced images. The enhancement is accomplished without altering the overall black-white contrast balance of the image and without creating defects not truly in the patient diagnostic image.

Figure 5:
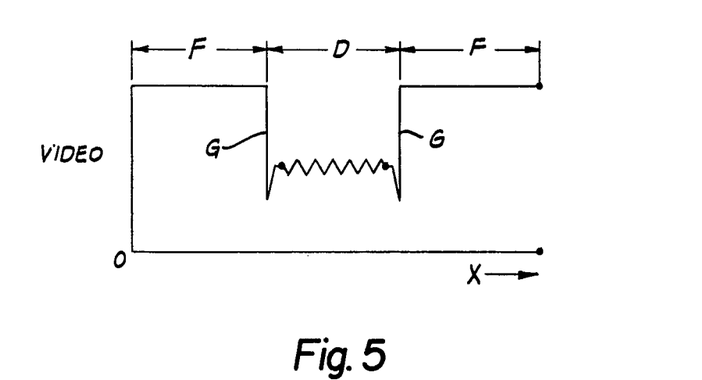
FIG. 5 is a graphical representation of a feature of some of the signals processed by the system of FIG. 1.

FIG. 5 is a graphical representation of the analog value of the video signal from the picture tube 16 and the camera control circuit 18, plotted against horizontal displacement of the reading electron beam as the television camera tube 16 scans across a single line of the target image. This graphical representation depicts the video signal level as the scanning beam traverses one line of an image wherein there is represented a portion of the patient's body having only partial and spatially irregular permeability to X-rays. This region of the line scan shown in FIG. 5 is indicated as having a width D. The adjacent regions, indicated as F, represent areas of the image in which there is substantially no attenuation of the X-rays passing through the patient's body. A concrete example of the graphical representation of FIG. 5 would result in a case where the region D encompasses a bone of the body, while the regions designated F correspond to fleshy parts of the body surrounding the bone.

It is known that various types of human tissue (bone, stomach, gall bladder, etc.) have irregular and finely detailed patterns of permeability to X-rays. These irregularities in permeability are observable as variations in the intensity of the X-rays passing through the tissue, and are known as "trebeculations." These irregularities occur with differing predominant spatial frequency of the detail and are characteristic of many types of tissue through which the X-rays pass. These dominant spatial characteristics of the trebeculations are useful in identifying the tissue appearing in various portions of an X-ray image.

It is desirable to emphasize the appearance of these fine detail characteristics in the viewed image, because it renders easier the identification of the types of tissue through which the X-rays pass, and also because such emphasis yields a subjectively more acceptable image. It is also desirable to emphasize the interfaces between various types of tissue.

As shown in FIG. 5, the characteristic spatial frequency of the detail characteristics for the type of tissue in the region D is represented by the illustrated small, high frequency variations in the amplitude of the video signal as the reading beam scans across one line of the image. The interfaces between the fleshy tissue of the areas F and the bone tissue of the area D are shown by the sharply sloping lines G.

FIG. 5 shows that, in the areas F, which are generally and uniformly permeable to X-rays, there is virtually no variation in the amplitude of the video signal. On the contrary, in the area D denoting bone tissue, and in the region of the lines G, indicating the interface between bone and other tissues, the amplitude of the video signal changes with a high frequency. It is these high frequency variations, indicating detail by spatial frequency characteristics of more or less solid tissue, and interfaces between various tissues, which are sought to be amplified in the system of this invention.

It is not, however, desirable to amplify all the video signals, since this would alter the level of the video signal in the areas F, which would in turn change the black-white overall balance of the picture. If all the video signals were uniformly amplified, unnecessary noise and spurious signals would appear in the image output, since all the signals would be raised in amplitude and the noise would become more objectionable.

Figure 4:
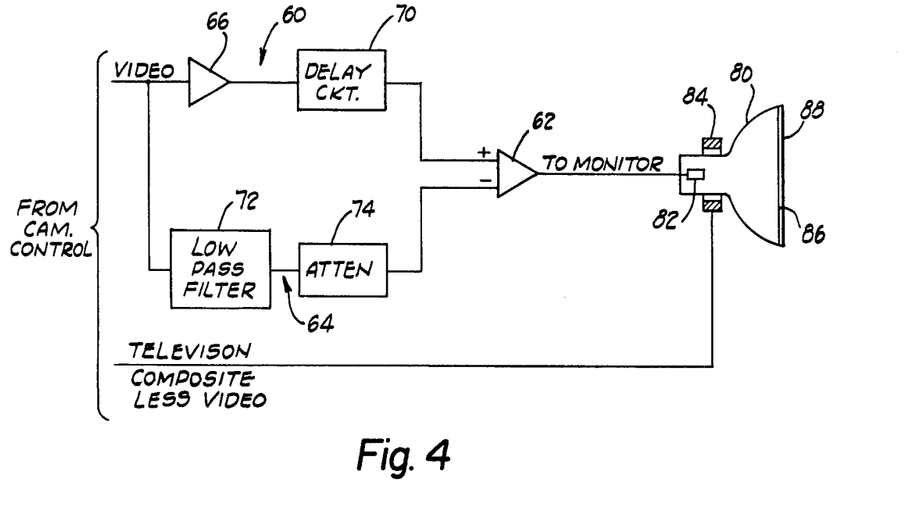

As shown in FIG. 4, the video enhancement circuitry 22 includes a first branch 60 for transmitting the entire frequency spectrum of video signals to one input (+) of a differential amplifier 62. The other input (−) of the amplifier 62 is supplied by a low pass branch 64, which inputs only the relatively low frequency video signals to the amplifier 62. The first branch 60 amplifies the full spectrum of video signals, while the low pass branch 64 delivers the lower frequencies to the amplifier 62, to be subtracted from the full spectrum. Therefore, the output of the amplifier 62 is a signal representing the amplified full video spectrum, less the lower video frequencies, producing an output in which the higher video frequency components are enhanced relative to the lower frequency components.

The first branch includes an amplifier 66 and a delay circuit 70, whose function is described below. The low pass branch 64 includes a low pass filter 62 for filtering out the higher video frequencies, and an attenuator 74 for adjusting the amplitude of the lower frequency video signals output from the low pass branch 64, which are subtracted from the full video spectrum by the amplifier 62.

The low pass filter 72 is a known type of filter having a pass band extending from approximately zero frequency to 1 megaherts (MHz). The characteristics of the low pass filter 72 are such that it retards the phase of the video signals passing through it. Consequently, the phase of the video signals passing from the low pass branch 64 to the amplifier 62 is retarded with respect to the video signals appearing at the output of the amplifier 66 in the first branch 60. If the signals from the first branch were impressed upon the amplifier 62 in their unshifted form, the output of the amplifier 62 would be spuriously affected because the amplifier 62 produces an accurate difference signal only when the phases of the signals at its two inputs are equal.

The delay circuit 70 delays the full spectrum of video signals from the amplifier 66 slightly, to place them in phase with the signals from the low pass branch 64, and enable the amplifier 62 to produce an accurate difference signal. The delay circuit 70 suitably comprises a known cable type of delay device, or another type of more compact delay circuitry known in the art. The characteristics of the delay circuit 70 are matched with those of the low pass filter 72, so that the time delay imposed by the delay circuit 70 is substantially equivalent to the average phase delay caused by teh low pass filter 72.

The enhanced video signals, and the synchronization and blanking signals making up the remainder of the television composite, are introduced to the television monitor 20. In response to these signals, the monitor 20 produces an enhanced television picture corresponding to the image viewed by the television pickup tube 16. The television monitor 20 is suitably embodied by a cathode ray tube having an envelope 80, an electron gun 82 and deflection plates and focusing coils represented at 84 for deflecting the electron beam from teh gun 82 onto a phosphor screen 86 inside an output face 88.

Preferably, the cathode ray tube is a Model 4869 cathode ray tube, manufactured by the Radio Corporation of American, Lancaster, Pa.

The film camera 24 is suitably positioned to view the monitor 20 for recording on the film the image produced by the monitor. The film camera 24 is suitably embodied by either a 105 millimeter still (single frame) camera, e.g., Model 6343, manufactured by Picker Corporation, Cleveland, Ohio, or by a moving picture, or "cine" camera, e.g., Model 3662, manufactured by Picker Corporation, Cleveland, Ohio.

The system described above has the capability of producing diagnostic quality television images of X-ray patterns from a patient. Tests have shown this system has a total modulation transfer function approximately described by a curve defined by the following points when the modified isocon television pickup tube is used:

| Line pairs/m.m. | % Contrast |
| --- | --- |
| 0.25 | 85 |
| 0.50 | 78 |
| 1.00 | 50 |
| 1.50 | 21 |
| 2.00 | 8 |

A system having a modulation transfer function as described above is capable of producing images which have superior quality relative to that of previously produced television images.

Evidence indicates that, when the image isocon pickup tube is replaced a previously described lead oxide vidicon (plumbicon) pickup tube, the modulation transfer function of the system is even better than that described above.

The embodiment described in this detailed description is intended as illustrative rather than exhaustive, and it is to be recognized that persons of skill in the art may make modifications, changes or additions to the embodiment described herein without departing from the spirit and the scope of the invention as described herein and in the appended claims.

What is claimed is:

1. A medical diagnostic system for producing an image of a pattern of penetrative radiation emergent from a subject, said system comprising:

(a) means for directing pulsed penetrative radiation through the subject;
    (b) an image tube for converting the radiation pattern to a corresponding first visual image, the image tube having an input face and an output phosphor having a substantially circular configuration and a diameter substantially greater than 25 millimeters;
    (c) electrical apparatus including a lead oxide vidicon television pickup tube and control circuitry for the pick up tube for converting the first visual image to image representing electrical signals;
    (d) video enhancement circuitry for disproportionately amplifying said electrical signals having a frequency in a range of approximately 1 megahertz to 20 megahertz for producing enhanced electrical signals, and
    (e) apparatus responsive to the enhanced electrical signals for producing an enhanced visual image corresponding to said first visual image.

2. The system of claim 1, wherein said output phosphor is at least approximately 35 millimeters in diameter.

3. The system of claim 1, wherein:
    said control circuitry comprises means for causing the television pickup tube to scan in a progressive consecutive line by line mode.

4. The system of claim 1, wherein:
    said control circuitry comprises means for operating said television pickup tube for scanning a single frame and subsequently interrupting said scanning for a period of time which is relatively long compared to the time required for scanning a single frame.

5. A method for producing an image of a pattern of penetrative radiation emergent from a subject, said method comprising the steps of:

(a) directing pulsed penetrative radiation through the subject;
    (b) converting the radiation pattern to a corresponding first visual image by the use of an image tube having an input face and an output phosphor having a substantially circular configuration and a diameter substantially greater than millimeters;
    (c) employing a lead oxide vidicon television pickup tube and associated control circuitry for converting the first visual image to image representing electrical signals;
    (d) disproportionately amplifying said electrical signals having a frequency within a range of about 1 meganertz to 20 megahertz for producing enhanced electrical signals, and
    (e) proding an enhanced visual image corresponding to said first visual image in response to the enhanced electrical signals.

6. The method of claim 5, wherein:
    said step of converting said first visual image comprises operating the television pickup tube to scan in a progressive consecutive line by line mode.

7. The method of claim 5, wherein:
    said step of converting said first visual image comprises operating the television camera pickup tube for scanning a single frame and subsequently interrupting said scanning for a period of time which is relatively long compared to the time required for scanning said single frame.

8. An imaging system for producing an enhanced image of a pattern of penetrative radiation emergent from a subject, comprising:

(a) apparatus for producing a first light image corresponding to the penetrative radiation pattern;
(b) television apparatus for converting the light image to corresponding electrical signals including a video signal bearing image brightness information;
(c) a monitor for producing a visible display corresponding to the first light image represented by the electrical signals; and
(d) video enhancer for disproportionately amplifying those video signal components having a frequency lying within a predetermined range.

9. The system of claim 8, wherein said video enhancer disproportionately amplifies video signals having a frequency of about 1 MHz to about 20 MHz.

10. The system of claim 8, wherein said video enhancer comprises:
(a) a first circuit branch connected to the television apparatus for receiving and passing substantially the full spectrum of the video signals;
(b) a low pass branch connected to receive and pass only those video signals having a frequency of less than a predetermined value; and
(c) a comparator for producing a signal which is a function of the difference of the video signals passed by the first branch and those passed by the low pass branch.

11. The system of claim 10, wherein said low pass branch comprises a low pass filter having an inherent delaying phase shift characteristic.

12. The system of claim 11, wherein said first branch further comprises a delay circuit for substantially equalizing the phases of the video signals from the first and low pass branches.

13. The system of claim 10, wherein said low pass branch further comprises:
an attenuator for adjusting the magnitude of the output of the low pass branch.

14. A method for producing an enhanced image of a pattern of penetrative radiation emergent from a subject, said method comprising the steps of:
(a) producing a light image corresponding to the penetrative radiation pattern;
(b) converting the light to corresponding electrical signals by the use of a television apparatus, said electrical signals comprising a video signal having image brightness information;
(c) disproportionately amplifying those video signals having a frequency greater than a predetermined value, relative to lower frequency video components, and
(d) producing a visible display corresponding to the image represented by the electrical signals.

15. The method of claim 14, wherein said disproportionate amplification step comprises amplifying selectively the video signals having a frequency of about one megahertz to at least about twenty megahertz.

16. A system for producing a visible light image corresponding to a pattern of invisible radiation, comprising:
(a) a source of invisible radiation;
(b) means for converting the invisible radiation to a first light image;
(c) electrical apparatus responsive to the first light image for producing electrical signals representing features of the first light image;
(d) apparatus responsive to the electrical signals for producing a second light image representing the pattern of invisible radiation; and
(e) means for processing the electrical signals to emphasize fine detail features represented by the electrical signals relative to more coarse detail features thereby represented whereby the second light image has an enhanced quality wherein finely detailed features are emphasized.

17. A system for producing a visible image representing a pattern of penetrative radiation emergent from a subject comprising:
(a) means for converting the radiation pattern to a first image projected along an optical axis;
(b) apparatus for converting the first image to representative electrical signals;
(c) an image producing means for converting the electrical signals to a visible image; and
(d) means associated with the radiation and first image converting means and the image producing means for enhancing the visible image to have a modulation transfer function at least as favorable as a curve approximately defined by the following points:

| Spatial Frequency (line pairs/m.m.) | % Contrast |
|---|---|
| 0.25 | 85 |
| 0.50 | 78 |
| 1.00 | 50 |
| 1.50 | 21 |
| 2.00 | 8 |

18. The system of claim 17, wherein:
said first image converting apparatus is aligned with the optical path and the first image is transmitted over the optical path to the first image converting means without any portion being diverted therefrom for reproduction purposes.

19. A method for producing an image representing a pattern of penetrative radiation emergent from a subject, said method comprising the steps of:
(a) converting the radiation patterns from the subject to a first image projected along an optical path;
(b) converting the first image to a pattern of electrical signals representative thereof; and
(c) producing from the electrical signals an enhanced visible image having a modulation transfer function at least as favorable as that described by a curve including approximately the following points:

| Spatial Frequency (line pairs/m.m.) | % Contrast |
|---|---|
| 0.25 | 85 |
| 0.50 | 78 |
| 1.00 | 50 |
| 1.50 | 21 |
| 2.00 | 8 |

20. The method of claim 19, further comprising the step of:
recording said enhanced visible image.

21. The method of claim 19, wherein the step of converting the first image to electrical signals comprises:
transmitting the first image along the optical path without diversion of any portion of the image from the optical path for purposes of recording.

22. An imaging system for producing a diagnostic quality television image representing penetrative radiation patterns emanating from a subject, the system comprising:
  (a) apparatus responsive to the penetrative radiation pattern for producing a first visible image thereof;
  (b) apparatus for transmitting the first visible image along an optical path;
  (c) television apparatus responsive to the transmitted first visible image to produce television signals representative thereof;
  (d) means responsive to the television signals for producing a television image representing the penetrative radiation pattern; and
  (e) means associated with the converting apparatus, transmission apparatus and television camera for enhancing the television signals to cause the television image produced by the monitor to have a modulation transfer function at least of the quality as that approximately described by a curve including the following points:

| Spatial Frequency (line pairs/m.m.) | % Contrast |
|---|---|
| 0.25 | 85 |
| 0.50 | 78 |
| 1.00 | 50 |
| 1.50 | 21 |
| 2.00 | 8 |

23. A system for producing an image of a pattern of penetrative radiation for a subject, comprising:
  (a) a source for directing penetrative radiation through the subject;
  (b) means for converting the emergent pattern of penetrative radiation to a visible light image;
  (c) a television camera for converting the visible light image to a pattern of electrical signals said television camera including an image isocon pickup tube having a target to mesh spacing of substantially less than 25 microns; and
  (d) means for reconverting said electrical signals to a second visible light image corresponding to said penetrative radiation pattern.

24. The system of claim 23, wherein the target to mesh spacing of the image isocon is not more than approximately 12 microns.

25. A medical diagnostic system for producing an image of a pattern of penetrative radiation emerging from a subject, said system comprising:
  (a) means for directing pulsed penetrative radiation through the subject;
  (b) an image tube for converting the radiation pattern to a corresponding first visual image;
  (c) electrical apparatus including a lead oxide vidicon television pickup tube and control circuitry for the pickup tube for converting the first visual image to image representing electrical signals, said lead oxide vidicon tube including a photocathode having a circular configuration and a diameter of at least approximately 28 millimeters, and
  (d) apparatus responsive to the electrical signals for producing a second visual image corresponding to said first visual image.

26. A medical diagnostic television system comprising:
  (a) a source for directing an adjustable duration pulse of penetrative radiation through a patient's body to emerge therefrom in a pattern, the pulse duration being substantially in excess of the standard television field scan duration of about one thirtieth of a second;
  (b) means responsive to the emergent pattern for producing an intensified representation of the pattern;
  (c) a television camera having a pickup tube and a target and being responsive to the intensified pattern representation to produce television signals describing the intensified representation;
  (d) control sync circuitry coupled to the television camera for effecting pulsed mode scanning of the pickup tube target wherein said control sync circuitry is responsive to the timing of each penetrative radiation pulse to initiate scanning by the television camera a relatively short time after each radiation pulse, and
  (e) display apparatus coupled to the television camera to produce a second representation corresponding to the radiation pattern in response to signals from the television camera.

27. A medical diagnostic television system comprising:
  (a) a source for directing a variable duration pulse of penetrative radiation through a patient's body to emerge therefrom in a pattern;
  (b) means responsive to the emergent pattern for producing an intensified representation of the pattern;
  (c) a television camera responsive to the intensified pattern representation to produce television signals describing the intensified representation viewed by the camera; and,
  (d) control sync circuitry coupled to the television camera for effecting pulsed mode scanning by the camera wherein said control sync circuitry is responsive to timing of a penetrative radiation pulse to initiate scanning by the television camera at a predetermined time with respect to the timing of the pulse.

28. A medical diagnostic television system comprising:
  (a) a source for directing a pulse of penetrative radiation through a patient's body to emerge therefrom in a pattern, the pulse duration being substantially in excess of one thirtieth second;
  (b) means responsive to the emerging pattern of radiation for producing an intensified representation of the pattern;
  (c) a television camera responsive to the intensified pattern representation to produce television signals representing the intensified representation viewed by the camera;
  (d) control sync circuitry coupled to the source and the television camera for effecting pulsed mode scanning of a target in the camera wherein said control sync circuitry is responsive to timing of said radiation pulse to initiate scanning of the target by the television camera a relatively short time after the end of each said pulse; and,
  (e) apparatus responsive to the television signals for producing a second representative of the radiation pattern.

29. A medical diagnostic television imaging method comprising the steps of:
  (a) directing a pulse of penetrative radiation through a patient's body to emerge therefrom in a pattern, the pulse duration being substantially longer than the vertical retrace time of a standard 30 Hz. television field scan rate;
(b) producing an intensified representation of the radiation pattern;
(c) scanning the intensified representation with a television camera;
(d) initiating scanning by the television camera in response to timing of the radiation pulse, said scanning taking place at a predetermined time relative to the radiation pulse timing.

30. A medical diagnostic television imaging method comprising the steps of:
(a) directing an adjustable duration pulse of penetrative radiation through a patient's body to emerge therefrom in a pattern;
(b) producing an intensified representation of the pattern;
(c) scanning the intensified representation with a television camera;
(d) initiating the scanning at a relatively short time after the radiation pulse, in response to the timing of the radiation pulse; and,
(e) producing a representation of the image viewed by the television camera.

31. A medical diagnostic television system comprising:
(a) a television system including a television camera including means for scanning a target to produce signals representing a viewed image;
(b) a source for directing penetrative radiation through a patient's body, independently timed with respect to camera scanning, to emerge therefrom in a pattern to which the camera can be made to respond;
(c) synchronization circuitry coupled to the television camera for initiating scanning by the camera, the timing of, said initiation being dependent upon the timing of said independently timed radiation pulse, and
(d) apparatus coupled to the television camera for producing a representation of said radiation pattern.

32. A radiation imaging system for medical diagnostic purposes, said system comprising:
(a) a source for directing penetrative radiation through the body of a subject in approximately one to six pulses per second;
(b) a television camera having a pick-up tube and a target and means for causing an electron beam to scan the target;
(c) means between the source and the television camera for converting radiation emergent from the subject to a form viewable by the television camera;
(d) circuitry coupled to the television camera for causing the camera to initiate a scan of its target as a dependent function of the timing of a radiation pulse.

* * * * *

UNITED STATES PATENT AND TRADEMARK OFFICE
CERTIFICATE OF CORRECTION

PATENT NO. : 4,193,089

DATED : March 11, 1980

INVENTOR(S) : Robert W. Brougham et al.

It is certified that error appears in the above—identified patent and that said Letters Patent is hereby corrected as shown below:

Column 7, line 34, "inventor-ship" should read

-- inventorship --.

Column 8, line 32, "photo-cathode" should read -- photocathode --.

Column 9, line 18, "plused" should read -- pulsed --.

Column 17, line 9, before "video" insert -- a --.

Signed and Sealed this

Twenty-second Day of July 1980

[SEAL]

Attest:

SIDNEY A. DIAMOND

Attesting Officer

Commissioner of Patents and Trademarks